United States Patent
Holland et al.

(10) Patent No.: US 6,418,201 B1
(45) Date of Patent: *Jul. 9, 2002

(54) MULTIPLE PLATFORM VOICE PROCESSING SYSTEM WITH OPTIMIZED RESOURCE ALLOCATION

(75) Inventors: John Holland; Paul Ranford; Peter Robson, all of Auckland (NZ); Neal Oliver, Florham Park, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,311

(22) Filed: Feb. 22, 2000

(51) Int. Cl.[7] ............................................. H04M 11/00
(52) U.S. Cl. .............................. 379/88.18; 379/201.02; 379/201.05
(58) Field of Search ........................... 379/88.01, 88.18, 379/196, 197, 198, 157, 165, 201.02, 201.05

(56) References Cited

U.S. PATENT DOCUMENTS

| | | | | |
|---|---|---|---|---|
| 5,402,478 A | * | 3/1995 | Hluchyj et al. | 379/220 |
| 5,841,854 A | * | 11/1998 | Schumacher et al. | 379/207 X |
| 5,875,242 A | * | 2/1999 | Glaser et al. | 379/88.17 X |
| 6,163,535 A | * | 12/2000 | Jordan et al. | 370/352 |
| 6,167,253 A | * | 12/2000 | Farris et al. | 455/412 |
| 6,205,204 B1 | * | 3/2001 | Morganstein et al. | 379/88.03 X |
| 6,304,645 B1 | * | 10/2001 | Holland et al. | 379/88.18 X |
| 6,307,836 B1 | * | 10/2001 | Jones et al. | 370/230 |
| 6,334,059 B1 | * | 12/2001 | Stilp et al. | 455/457 X |

* cited by examiner

*Primary Examiner*—Creighton Smith
(74) *Attorney, Agent, or Firm*—Kaplan & Gilman, LLP

(57) ABSTRACT

A call processing system is disclosed wherein plural platforms are populated with plural voice boards. Each board on the different platforms is populated with different resources, and resources may be allocated from any board and any platform to process calls. In a preferred implementation, a priority system is established so that co-located resources are preferred.

15 Claims, 2 Drawing Sheets

MULTIPLE PLATFORM VOICE PROCESSING SYSTEM WITH OPTIMIZED RESOURCE ALLOCATION

TECHNICAL FIELD

This invention relates to a voice processing system, and more particularly, to an improved voice processing architecture that permits multiple different resources from multiple different vendors to operate with one another. This invention also provides an optional technique that optimizes from where the resources are allocated for any call.

BACKGROUND OF THE INVENTION

Voice processing systems have become prevalent in modern day society. Such systems typically involve a telephone caller dialing into a computerized integrated voice response (IVR) system. The interaction between the remote user dialing in and the computerized system varies widely and is application specific. Typical examples of such systems include banking systems which allow a user to transfer funds between accounts and ascertain account balances, credit card corporation systems, etc.

Recently, it has also become popular to merge together these voice processing systems with facsimile, e-mail and other capabilities. One such example is what is termed fax-on-demand. In fax-on-demand systems, a remote user dials in to a computer and enters through his telephone keypad the digits corresponding to a particular item or product number. Additionally, a facsimile number may be entered via a touch tone keypad, and is interpreted by this system. The fax-on-demand system then transmits documentation regarding the particular item or product to a facsimile machine located at the specified remote telephone number.

In view of the evolving and complex nature of many of today's modern voice processing systems, it has become standard to construct such voice processing systems from a plurality of different client applications. The voice processing applications may include fax-on-demand, voice mail, etc., all interconnected via a local area network or other such means.

It has also become fairly standard to utilize voice processing resources flexibly between calls. For example, typical voice processing resources include such items as tone detectors for detecting the digits entered via a DTMF keypad, echo cancellers for filtering echo from the telephone network, voice recognition software for allowing a remote user to input commands via voice, etc.

One problem with such systems is that the voice processing applications, as well as the resources, tend to vary widely in their design and implementation. Multiple vendors each implement their systems differently and it is difficult for these items to work together. Additionally, the systems are not very flexible because there usually exists a set of circuit boards on a single platform for implementing all of the required call processing functions. Once the resources on the platform are used up, calls simply cannot be processed and are instead blocked.

In view of the foregoing, there exists a need in the art for a more flexible and configurable voice processing system which can optimally utilize the resources of a variety of different vendors in a variety of different configurations. The system should also permit an application to operate irrespective of different types of locations of resources (tone detectors, signal generators, etc.) that are being used to implement the voice processing application.

SUMMARY OF THE INVENTION

The above and other problems of the prior art are overcome and a technical advance is achieved in accordance with the present invention which relates to a more flexible user configurable and higher capacity multiple platform voice processing system. In accordance with the invention, a plurality of call processing resources are arranged on various circuit cards (i.e., voice processing cards). A plurality of such cards are installed into a particular voice processing platform. Plural voice processing platforms are then interconnected, preferably via an ATM switch. Additionally, the ATM switch may be replaced with other switching arrangements, and the platforms may be interconnected with different types of switching arrangements.

A plurality of voice processing applications, possibly running on different computers, communicate with a CT server which queries all of the different voice processing resources and configures the required resources for processing a particular call. The resources may be from different vendors from the same or different voice processing boards, from the same or different voice processing platforms, and may change during the duration of any particular call. The entire configuration of the voice processing resources is isolated from, and invisible to, the voice processing application. As a result, the application can operate in an identical manner whether voice processing resources are allocated to process the particular call are allocated from the same or different locations.

In a preferred embodiment, calls may be processed by first attempting to allocate resources from the same board, then from the same platform, then the same location. Only if necessary are resources that are remotely located with respect to each other allocated to service a call.

In an additional embodiment, resources required to process a call might be allocated based upon any methodology that minimizes the system "cost." An exemplary technique is disclosed wherein costs are assigned to each allocated resource and to the allocation of communications channels between resources. Importantly, the disclosed technique is able to minimize the cost of a group even when the costs of various resources and communications channels change during system operation, due to variance in system loading and other conditions.

DETAILED DESCRIPTION OF THE PREFERRED EMBODIMENT

Figure 1:
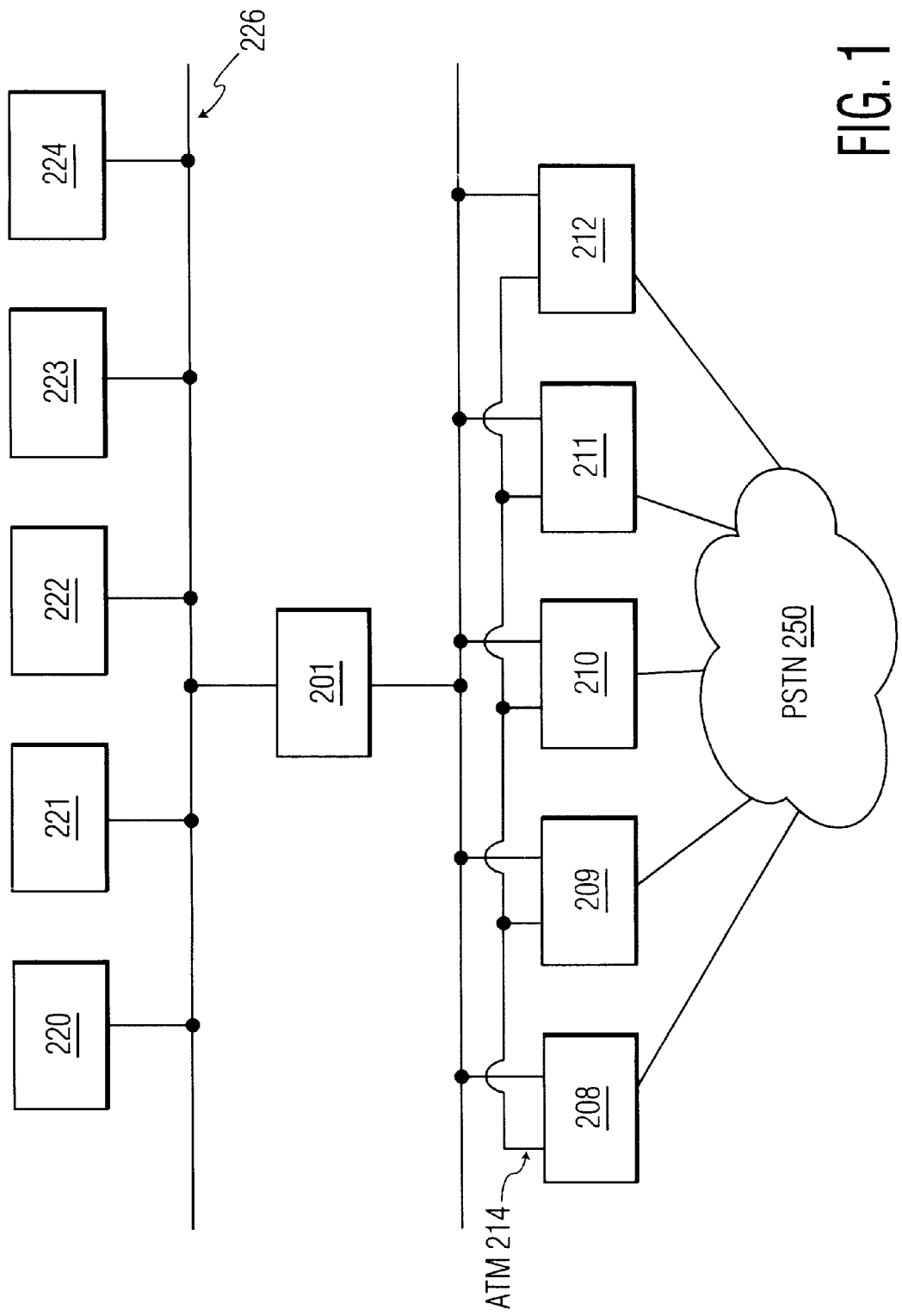
FIG. 1 shows a conceptual block diagram of an exemplary embodiment of the present invention.

FIG. 1 shows an exemplary functional diagram for implementing teachings of the present invention. The arrangement in FIG. 1 includes a plurality of client personal computer based systems 220–224, all connected via a network 226 and in communication with a CT server 201. The PC based systems run a variety of voice processing and call center applications which vary greatly from system to system. The particular techniques utilized by each of these systems is not critical to the present invention.

Additionally, voice processing platforms 208–212 are interconnected with each other via an ATM switch 214, and these voice processing platforms may also communicate with a CT server 201 via a network and via a standard or proprietary protocol.

In operation, a call arrives from the remote user over public switched telephone network (PSTN) 250 and is received through one of call processing platforms 208–212. The CT server receives the call and connects appropriate applications 220–224 to the call. The CT server then analyzes the call in response to messages received from the application in order to ascertain the particular group of resources which is required to process the particular call. Depending upon the call and/or the application, these resources may include items such as tone generators, speech recognition algorithms, echo cancellers, or any other of a variety of potential resources for processing various aspects of any particular call. The assembling, modification, and disassembling of the group of resources is described in U.S. Pat. No. 5,608,791 issued to the assignee of the present invention.

Based upon the particular arriving call and the application, the CT server determines which particular resource types are necessary in order to process the call. The CT server then includes a record of the particular resources available on each of platforms 208–212. The particular resource types are picked and configured into a logical group, so that the call may be processed by those resources. Each of those resources communicates with the CT server via a standard or proprietary protocol, and thus, the resources may be from different vendors, yet still be utilized to process a single call. Moreover, the application is unaware of the particular resource utilized and whether those resources are located on the same board, platform, or remotely from one another.

In the preferred embodiment, a priority scheme is utilized in order to attempt to locate as many of the resources as possible, if not all of them, on the same board. Since the CT server has a list of all of the different resources and where they are located, this can be attempted first. If the resources are not available on the same board, the CT server attempts to locate them on the same platform, and ultimately, on different platforms only if necessary.

In an additional embodiment, human user interaction is permitted to assist the system in determining how to allocate the call processing resources for a particular call or a portion thereof. Specifically, based upon system loading, priorities, or other criteria, a human operator may determine that certain resources should be used for particular call processing. In such a scenario, the CT server 201 provides an interface to permit the operator to override the allocation that would otherwise be set by the system.

Figure 2:
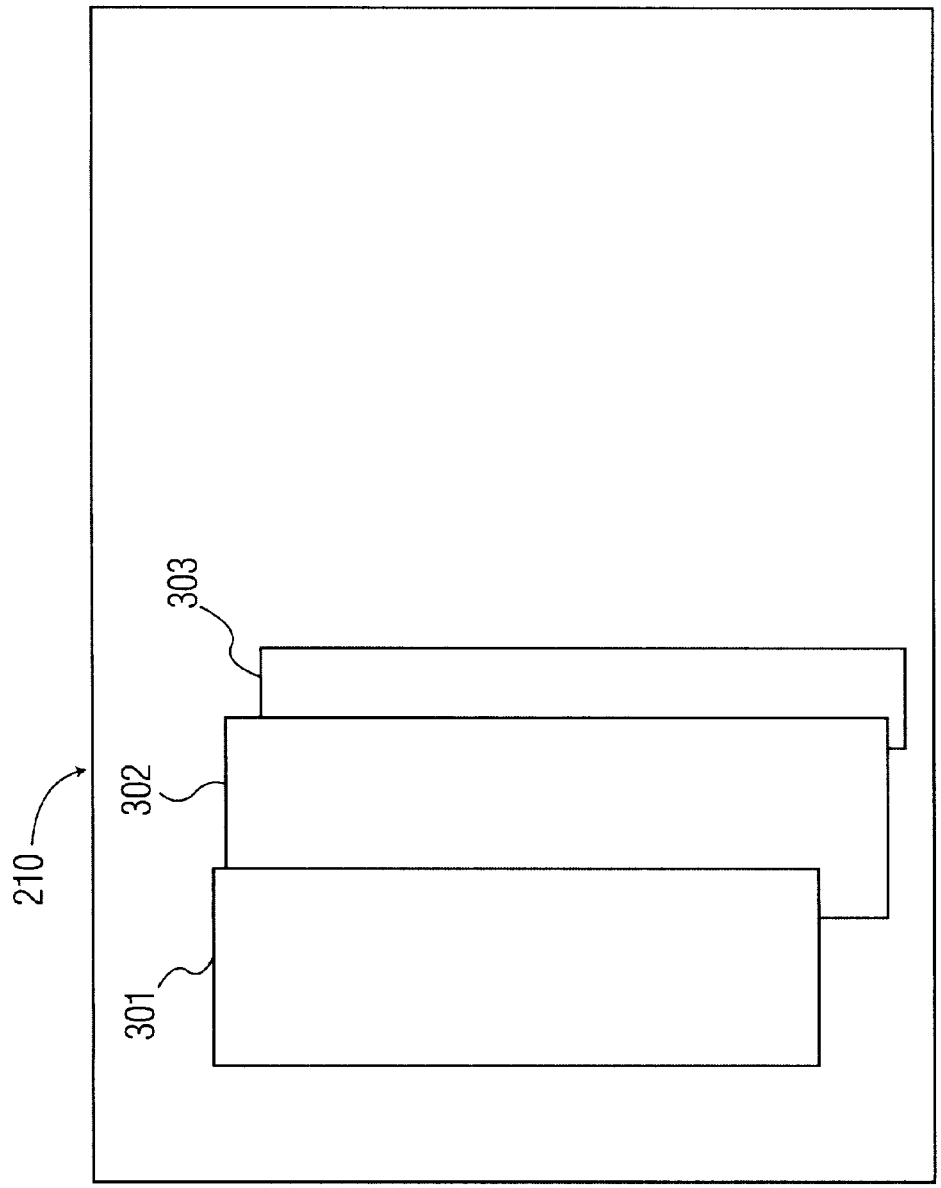
FIG. 2 shows a diagram of a voice processing platform that may be used in implementing the system describe herein.

FIG. 2 shows a conceptual diagram of one of voice processing platforms 210. The voice processing platform 210 is populated with voice processing (resource) boards 301–303. These boards may be identical or different and may be utilized for different calls in different manners, as required by the system. Call processing resources on any particular board may be utilized by any particular line calling in. The resource, the board, or even the platform is tied to no particular channel, and thus, the entire system is utilized as a large resource pool spanning multiple platforms and ensuring availability of all resources to all calls. Moreover, the preferred method of interconnection, ATM switching, results in far more bandwidth to connect to resources than is typically needed. The interconnection of the platforms may also be accomplished through the use Ethernet switching, H-323, CT Bus, the Infiniband architecture, or any other relatively high bandwidth connection. The high speed interconnection facilitates the exchange of the media stream among the platforms.

Neither the call processing resources nor the applications themselves need operate any differently whether for resources that are remotely located than for resources that are co-located. Moreover, not only is increased flexibility automatically achieved, but a level of fault tolerance is also an inherent result of the architecture. Specifically, if a single circuit board or even a platform becomes inoperable, the resources from that board or platform would be available on other platforms or boards. Other than slightly diminished capacity as a result of the fact that less of the resource type is available, the applications and the other call processing resources are unaffected by the fact that a single board or resource has dropped out of the system as a result of becoming inoperable.

In an additional embodiment, a separate algorithm may be employed for determining how to configure the resource group in the most efficient manner. Specifically, the assumption in the previous embodiment is that the "best" way to configure the group is through the use of resources that are as closely located physically as possible. Hence, the default configuration is to locate the resources on the same board if possible, and if not, on the same platform. Only if necessary are the resources remotely located. Although such a technique is simple and often optimal, there are situations where the technique may be less than optimal. Therefore, we discuss below an additional embodiment of the invention to optimize the configuration of the group under certain circumstances where it is desirable to utilize remotely located resources.

Typically, each call processing board in the system includes a plurality of channels, and each channel may contain several resources. Calls may require some or all of the resources from a particular channel. However, the architecture of the board may be such that the channel and all resources must be allocated together. Thus, allocation of the channel for the purpose of using one of its resources as part of a group results in the remaining resources being wasted. If a resource that is needed for a call is available in two places, one co-located with the other needed resources and another not so co-located, it may be better to allocate the latter. This situation could arise if the resource that is not co-located with other needed resources may be allocated separately, whereas the co-located resource needs to be allocated with other resources that are not needed for the call. Thus, allocating the co-located resource wastes the additional resources that must be allocated, but remotely allocating a resource does not waste other resources. Hence, the latter is preferred.

Another situation where it may be better to allocate remotely located resources to process a single call rather than co-located resources is when it is desirable to evenly distribute the system load. Specifically, calling patterns may be such that trying to allocate all resources for the calls on a single board may result in one board or one platform of boards being far more heavily loaded than others. This results in single point of failure that could be catastrophic. It may be desirable to spread the system load, even at the expense of remotely locating resources for a common call. Finally, if the communications among the various boards or platforms are such that system loading is less than if the resources are on the same platform or board, then it would be desirable to remotely locate the resources.

In accordance with the foregoing, the present invention contemplates the use of graph optimization algorithms to allocate the resources in the group. Each resource, as well as each of the communications channels therebetween, is assigned a cost. The costs may be, for example, anywhere from 1–10. If the assignment of a resource carries with it the assignment of other resources which are not needed and thus are wasted, then the assignment of that particular resource is made more expensive. A table is maintained that stores the cost of each allocation. When a group has to be configured to process the call, the resources are chosen such that the total system cost of the group is minimized. This may mean that resources are remotely located.

Additionally, the cost of the resources may vary dynamically throughout operation of the system. For example, a cost table is maintained that includes the cost of each resource on each board being allocated. The cost may be increased or decreased based upon the loading of any particular board. Thus, if a board is relatively heavily loaded with processing tasks, the cost of allocating resources on that board would increase. The board could signal the cost table and increase the cost. By doing so, any total cost of a group that includes resources on that board would increase, which in turn would decrease the chance of such resources being allocated. Simply put, the more heavily loaded a board is, the less likely that future groups will be allocated from that board. This will result in the system load being more evenly distributed among the several boards or platforms in the system.

Additionally, the costs do not preclude allocation of a resource from a heavily loaded board Rather, an increased cost just makes it more difficult to allocate resources, and thus, less likely that they will be allocated from a particular board. Thus, they are still available if needed, but as aboard is more heavily loaded, its resources become less preferred.

In addition to the above, other factors may result in the dynamic varying of the cost for a particular allocation. For example, because of system bus loading within a platform, communications within a platform may diminish system performance more than communications between two different system platforms. For these reasons, the costs should be adjusted periodically. One technique of doing such cost adjustment is to periodically poll all of the resources for present costs. Another such technique is to have the resources periodically report the cost of allocation to the cost table. As events occur and circumstances change, the costs are reported, with each resource or board having a prestored table that indicates how the costs should change in response to any particular event that occurs.

In another embodiment, costs may be different depending upon the purpose for which the resource is allocated. Thus, a resource may have two or more costs associated with it, although this method is the less preferred because of the complex nature of it.

The above describes the preferred embodiment of the invention. Various other modifications and additions will be apparent to those of skill in the art, and such modifications are intended to be covered by the following claims.

What is claimed:

1. A voice processing system for connection to the public switched telephone network comprising:
   a computer telephony server for interfacing to a plurality of client computers, the client computers containing voice processing applications;
   a processor for communicating with said voice processing applications and for determining what set of resources a particular telephone call being processed requires,
   a plurality of platforms, each of said platforms containing a plurality of voice processing resources, the resources being on one or more circuit boards, each of said platforms being interconnected with others of said platforms, and each of said platforms being in communication with said processor, and
   allocation software running on said processor for allocating available resources from said platforms to process calls, the allocation software being arranged to allocate the resources either from the same or from different platforms, depending upon availability, the allocation software also being configured to route information for processing a call to and from resources allocated for that call such that the voice processing application processing that call processes the call in a substantially identical manner whether the allocated resources are from the same or different boards or platforms.

2. The system of claim 1 wherein the platforms are connected by an ATM switching arrangement, said ATM switching arrangement be configured to facilitate exchange of a real time media stream among said platforms.

3. The system of claim 1 wherein the allocation software is arranged to prioritize allocation by first attempting to allocate resources for a call on the same circuit boards, then on the same platform, and then on different platforms.

4. The system of claim 1 wherein resources compiled for a call are configured into a resource group identified with that call, and wherein the resource group identified with that call may change during the duration of the call as new services are required or requested for the call.

5. The system of claim 1 wherein the allocation software and the voice processing applications communicate with each other over a local area network.

6. The system of claim 1 wherein said processor and said platforms communicate via a standard or proprietary protocol.

7. A method of processing a telephone call in a voice processing system, the method comprising the steps of:
   connecting a plurality of resource platforms to communicate with each other, the resource platforms each including a plurality of voice processing boards;
   connecting the resource platforms to a computer telephony server, computer telephony server being arranged to configure selected resources from one or more of said voice processing boards and said resource platforms to process a call; and
   connecting said computer telephony server to a plurality of client computers running voice processing applications software such that said voice processing applications software runs without being in possession of any information indicative of whether resources allocated to process a call are located on the same or different voice processing boards or on the same or different resource platforms.

8. The method of claim 7 wherein a group of resources allocated to process a particular call includes a resource set that changes during the duration of said call.

9. The method of claim 8 wherein resources to process a particular call are allocated from the same voice processing board if available, and if not available, from the same resource platform and if not available, from different resource platforms.

10. A voice processing system comprising a plurality of voice processing platforms, each platform including a plurality of voice processing boards, the voice processing boards in a platform being connected to communicate with each other over a computer bus, the voice processing platforms being connected to communicate with each other via a switch, the voice processing platforms being connected to a computer telephony server, the computer telephony server being arranged to process each of a plurality of arriving calls by analyzing resource requirements for each call and constructing a group of resources to process the call, the resources in a group being either on the same or different voice processing boards or on the same or different voice processing platforms depending upon availability of such resources needed to process the call.

11. The system of claim 10 wherein the CT server includes a user interface and software which allows a user to specify resources to be used in processing a call, thereby overriding the resources allocated by the CT server.

12. The system of claim 10 wherein said switch is an ATM switch.

13. The system of claim 10 wherein said CT server communicates with plural personal computers via a standard or proprietary protocol.

14. The system of claim 12 wherein the CT server has a priority scheme that attempts to allocate resources that are physically co-located to the extent such allocation permits proper call processing.

15. The system of claim 14 wherein said priority scheme first attempts to allocate all resources from a single board, then from a single platform, and then from multiple platforms.

* * * * *